United States Patent [19]

Ishikawa et al.

[11] Patent Number: 4,871,958
[45] Date of Patent: Oct. 3, 1989

[54] CHARGING CIRCUIT

[75] Inventors: Hiroichi Ishikawa; Yasuo Nagasawa, both of Saitama, Japan

[73] Assignee: Toko, Inc., Japan

[21] Appl. No.: 134,710

[22] Filed: Dec. 18, 1987

[30] Foreign Application Priority Data

Dec. 26, 1986 [JP] Japan .................................. 61-313478

[51] Int. Cl.4 .............................................. H02J 7/00
[52] U.S. Cl. ......................................... 320/32; 320/39
[58] Field of Search ..................................... 320/32, 39

[56] References Cited

U.S. PATENT DOCUMENTS

| 3,864,617 | 2/1975 | Smith et al. | 320/32 X |
| 4,472,672 | 9/1984 | Pacholok | 320/32 X |
| 4,667,143 | 5/1987 | Cooper et al. | 320/32 X |

FOREIGN PATENT DOCUMENTS 56-9335  3/1981  Japan .

Primary Examiner—R. J. Hickey

[57] ABSTRACT

In a charging circuit, a current correcting circuit is provided which includes a transistor, the collector current of which is permitted to flow through a resistor for setting up a reference voltage for a comparator circuit. The current correcting circuit is arranged such that when the output voltage of the charger goes below a predetermined level, the transistor is rendered conductive to compensate for the decrease in the reference current, thereby preventing the current from being decreased which flows through the resistor of the comparator circuit.

2 Claims, 1 Drawing Sheet

CHARGING CIRCUIT

BACKGROUND OF THE INVENTION

1. Field of the Invention

This invention relates to a charger for charging a battery, and more particularly it pertains to such a charger using a switching power supply device.

2. Description of the Prior Art

To charge a battery quickly without damage, it has been considered ideal to cause a constant current to flow in the battery. With constant current flow, however, there is a tendency that when the battery is sufficiently charged, a high charging voltage is applied thereto while when the battery is discharged to be substantially empty, the output voltage thereof is decreased substantially down to zero. A switching power source has been conventionally employed to charge a storage battery, but because of such a battery having the property mentioned just above, it is required that the power source be able to cope with an output voltage variation.

With this type of charger, in an attempt to keep the charging current constant, it has been the usual practice to control the pulse width of the switching signal by feeding back thereto an error signal derived from a comparator circuit for comparing output current with reference current However, when the output voltage of the storage battery goes below a predetermined level (referred to as lower limit voltage level hereinafter), the reference current is also decreased so that the comparator circuit fails to operate satisfactorily. Under such a condition, constant current control doe not work, and thus the output current is gradually decreased as shown by a broken line in FIG. 2. For a region in which the output voltage departs from the normal charging range, especially for a region in which the output voltage goes below the lower limit voltage level as shown in FIG. 2, the property of the circuit is greatly influenced by scattering in the properties of the circuit elements. This has a remarkable effect on the properties of the circuit, and thus it turns out to be unstable so that the expected charging operation may fail to be performed. Another problem is that when the output voltage has gone below the lower limit voltage level, since the output current has been decreased. it takes a long time before the voltage recovers to the design range.

Such a problem could be solved by providing an independent reference constant current source which is free from the influence of the output voltage, but this approach is disadvantageous in that a complex and expensive circuit arrangement is needed to achieve this.

SUMMARY OF THE INVENTION

Accordingly, it is an object of the present invention to provide a switching power supply type charging circuit having a simplified construction and yet being capable of charging a substantially completely discharged storage battery.

Briefly stated, the battery charger embodying the present invention is characterized by a current correcting circuit including a transistor the collector current of which is permitted to flow through a resistor for setting up a reference voltage for a comparator circuit, the current correcting circuit being designed such that when the output voltage of the charger goes below a predetermined level, the transistor is rendered conductive to compensate for the decrease in the reference current, thereby preventing the current which flows through the resistor of the comparator circuit from decreasing.

Other objects, features, and advantages of the present invention will become apparent from the ensuing description taken in conjunction with the accompanying drawings.

DESCRIPTION OF THE PREFERRED EMBODIMENTS

Figure 1:
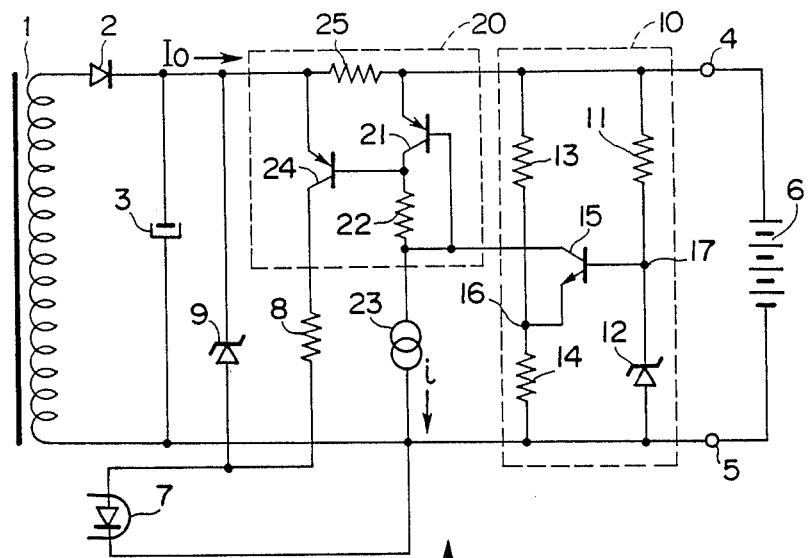
FIG. 1 is a circuit diagram showing the battery charger according to an embodiment of the present invention.

Referring to FIG. 1, there is shown a circuit diagram of the secondary side portion of the battery charger according to an embodiment of the present invention which uses a switching power supply device.

A diode 2 and capacitor 3 connected to the secondary winding of a transformer 1 constitutes a rectifier-smoothing circuit. Indicated at 4 and 5 are charging output terminals between which a battery 6 is connected. A series connection of a resistor 11 and Zener diode 12 and another series connection of resistors 13 and 14 are also provided between the charging output terminals 4 and 5. A transistor 15 has its base connected to a junction point 17 between the resistor 11 and the Zener diode 12. The emitter of the transistor 15 is connected to a connection point 16 between the resistor 13 and the resistor 14, and the collector thereof is coupled to the base of a transistor 21. It is to be particularly noted that a current correcting circuit 10, which constitutes a characteristic feature of the present invention, is formed by the transistor 15, resistors 11, 13 and 14, and Zener diode 12

Further, a comparator circuit 20 is constituted by the transistor 21, another transistor 24, and resistors 22 and 25. The transistor 21 has its emitter connected to the positive terminal 4. The collector of the transistor 21 is connected to the base thereof through a resistor 22 and also a constant current source 23. The transistor 24 has its base connected to the collector of the transistor 21. The emitter of the transistor 24 is connected to the terminal 4 through a resistor 25 which is provided for the purpose of current detection. Indicated at 7 is a light emission diode (LED) which is adapted to serve as a photo coupler for feeding an error signal back to the primary winding of the transformer 1. A resistor 8 serves as current determining resistor for the error signal, and a Zener diode 9 serves as a constant voltage source.

A DC power source 30 and a switching transistor 40 are connected in series with the primary winding of the transformer 1. A phototransistor 50 constitutes a photo coupler, together with LED 7.

A control circuit 60 operates to turn on or off the switching transistor 40 so that a pulse voltage is induced in the secondary winding of the transformer 1. The pulse voltage in turn is smoothed out by diode 2 and capacitor 3 so that a DC output current $I_0$ and an output voltage are provided. The output current $I_0$ is compared with a reference current i in comparator circuit 20, and an error signal resulting from the comparison is supplied to LED 7. The output voltage is detected by Zener diode 9, and an error signal is also supplied to LED 7. The current and voltage error signals are transmitted from LED 7 to phototransistor 50. Control circuit 60 controls the switching operation of switching transistor 40 in accordance with the amplitude of the error signals.

The operation of this charging circuit will now be explained. Description will first be made of the operation which occurs in the absence of the current correcting circuit 10 on the assumption that the values for the resistors 22 and 25 are $R_{22}$ and $R_{25}$ respectively.

A reference current i derived from the constant current source 23 is permitted to flow through the resistor 22 and the base of the transistor 21. However, when the current gain of the transistor 21 is high, most of the current is caused to flow through the collector of the transistor 21.

Thus, on the assumption that the current flowing through the base of the transistor 21 is negligibly small, a voltage produced across the resistor 22 is equal to $i \times R_{22}$. The series circuit of the resistor 22 and the collector-emitter of the transistor 21 is arranged such that the voltage between the base and the emitter of the transistor 21 is divided by the voltage across the resistor 21 and the voltage between the collector and the emitter thereof. The design is made such that the voltage occurring in the series circuit of the resistor 22 and transistor 21 is equal to or less than 0.6 V for the case where the transistor 21 is a silicon transistor.

The voltage between the base and the emitter of the transistor 24 is given as a sum of a voltage which is lower by $i \times R_{22}$ than the base-emitter voltage of the transistor 24, and a voltage, $I_0 \times R_{25}$, across the resistor 25 which results from the current $I_0$ flowing therethrough.

In this way, if the transistors 21 and 24 have identical baseemitter voltage characteristics, the voltage $I_0 \times R_{25}$ produced across the resistor 25 is compared with the voltage $i \times R_{22}$ produced across the resistor 25. As the output current $I_0$ increases so that the voltage $I_0 \times R_{25}$ exceeds the voltage $i \times R_{22}$, the transistor 24 is rendered non-conductive. Consequently, light is emitted from the LED 7 in the photocoupler so that the pulse width of a switching signal at the primary winding of the transformer 1 is controlled to reduce the output current $I_0$.

In this way, when the output current $I_0$ is being controlled in accordance with the light quantity of the photocoupler, the following equation holds:

$$I_0 = (R_{22}/R_{25}) \times i$$

It will be seen that the output current $I_0$ depends on the values for the resistors R22 and R25 and the current i of the constant current source. However, there is a general tendency that when the storage battery 6 has been completely discharged, the reference current i supplied from the constant current source 23 cannot be maintained at a constant value and thus is decreased.

The present invention is characterized in that there is provided a current correcting circuit 10 which is arranged to compensate for the reduction of the reference current i. Description will now be made of the operation of this current correcting circuit 10.

Figure 3:
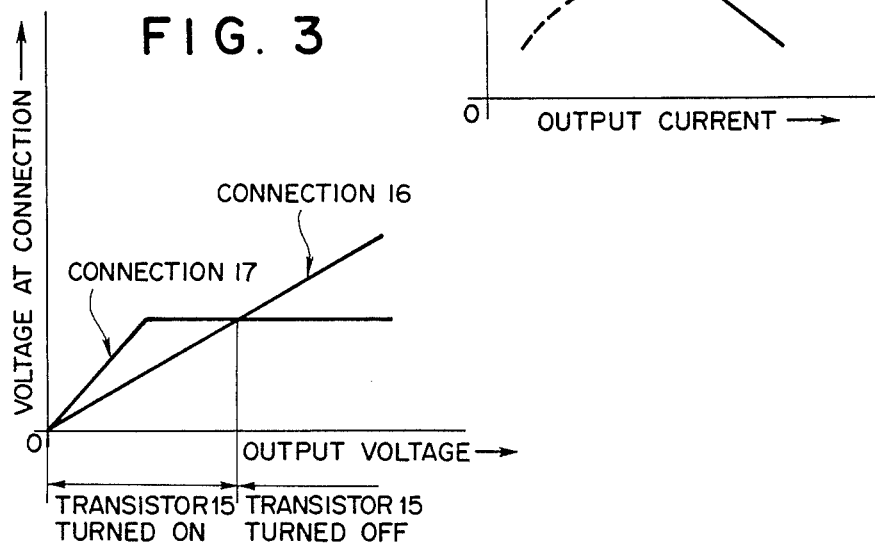
FIG. 3 is a view illustrating the relationship between the output voltage of the charger and the voltages at main portions thereof.

At the connection point 16 between the resistors 13 and 14, there occurs the output voltage divided by the resistance values for these resistors. A voltage at the connection point 17 between the resistor 11 and the Zener diode 12 is fixed at the level of the Zener voltage of the Zener diode 12. Consequently, the base of the NPN transistor 15 is kept at a constant level, and the emitter there is provided with a voltage obtained by dividing the output voltage, as shown in FIG. 3. Thus, it is possible to arrange the transistor 15 such that with a predetermined output voltage level as a border, the transistor 15 is turned on with a voltage below the border level, while it is turned off with a voltage above the border level. When the transistor 15 is turned on, the current flowing through the resistor 22 of the comparator circuit 20 is permitted not only through the constant current source 23 but also through the resistor 14.

Figure 2:
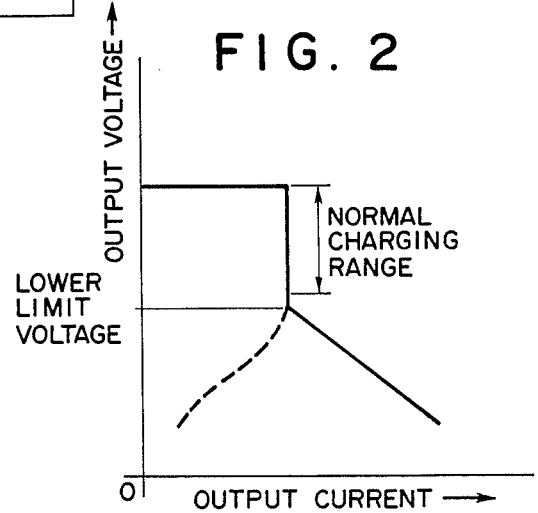
FIG. 2 is a view illustrating the relationship between the output voltage and the output current of the battery charger.

By setting as a lower limit the border voltage level above which the transistor 15 is turned on and below which it is turned off, it is possible to make the output current $I_0$ to be increased instead of being decreased as in the prior art even when the output voltage goes below the border voltage level, as illustrated by a solid line in FIG. 2. Thus, when an empty storage battery is to be charged, the lower limit voltage is quickly reached so that the period of time during which voltage at the battery is outside the normal charging range, can be greatly shortened.

As will be appreciated from the above discussion, according to the present invention, there is provided a switching power supply type charging circuit of a simplified construction with which it is possible to prevent the charging current from being decreased even when the output voltage becomes lower than the lower limit voltage level so that charging of an empty battery can be completed in a shorter time.

While the present invention has been illustrated and described with respect to a specific embodiment thereof, it is to be understood that the present invention is by no means limited thereto but encompasses all changes and modifications which will become possible within the scope of the appended claims.

We claim:
1. A charging circuit, comprising:
   a transformer including a primary winding and a secondary winding;
   a DC power source and switching means which are connected in series with the primary winding of said transformer;
   a constant current source;
   a comparator circuit including a first resistor and a second resistor, means connected to said first resistor for causing an output current to flow therethrough, means connected to said second resistor for causing a reference current to flow therethrough, said comparator circuit being arranged to compare said output current with said reference current to provide an error signal;
   a control circuit responsive to said error signal to turn on or off said switching means in accordance with the amplitude of said error signal;
   a current correcting circuit including a transistor operatively connected to said first resistor to be rendered conductive when the voltage of the output current is lower than a predetermined level, said transistor being operatively connected to said second resistor so that the collector current flows through said second resistor of said comparator circuit, a DC voltage being applied across the primary winding of said transformer and being turned on and off by said switching means so that a pulse voltage is induced in the secondary winding of said transformer, and said pulse voltage is rectified and smoothed out so that an output current is provided, the output current being controlled by feeding error signals back to said control circuit.

2. The circuit according to claim 1, wherein said current correcting circuit includes a third resistor and a Zener diode which are connected in series with each other, and a fourth resistor and a fifth resistor which are connected in series with each other, said transistor having the base thereof connected to a connection point between said third resistor and said Zener diode and also having the emitter thereof connected to a connection point between said fourth resistor and said fifth resistor.

* * * * *